US008219301B2

(12) United States Patent
Tanaka

(10) Patent No.: US 8,219,301 B2
(45) Date of Patent: Jul. 10, 2012

(54) CONTROL DEVICE FOR INTERNAL COMBUSTION ENGINE

(75) Inventor: Hiroyuki Tanaka, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 197 days.

(21) Appl. No.: 12/449,871

(22) PCT Filed: Mar. 17, 2008

(86) PCT No.: PCT/JP2008/054889
§ 371 (c)(1), (2), (4) Date: Sep. 1, 2009

(87) PCT Pub. No.: WO2009/025097
PCT Pub. Date: Feb. 26, 2009

(65) Prior Publication Data

US 2010/0059019 A1 Mar. 11, 2010

(30) Foreign Application Priority Data

Aug. 21, 2007 (JP) ................................ 2007-215035

(51) Int. Cl.
*B60T 7/12* (2006.01)
*G05D 1/00* (2006.01)
*G06F 7/00* (2006.01)
*G06F 17/00* (2006.01)

(52) U.S. Cl. ..... 701/103; 701/110; 701/115; 123/90.15; 123/406.23; 123/406.45

(58) Field of Classification Search ........................ None
See application file for complete search history.

(56) References Cited

U.S. PATENT DOCUMENTS

| | | | | |
|---|---|---|---|---|
| 6,497,212 | B2 * | 12/2002 | Matsumoto et al. | 123/295 |
| 6,932,053 | B2 * | 8/2005 | Ichihara et al. | 123/344 |
| 7,181,908 | B2 * | 2/2007 | Naik | 60/295 |
| 2004/0206068 | A1 * | 10/2004 | Michelini | 60/284 |
| 2005/0109318 | A1 * | 5/2005 | Ichihara et al. | 123/406.45 |
| 2006/0102143 | A1 | 5/2006 | Yagi | |

FOREIGN PATENT DOCUMENTS

| | | |
|---|---|---|
| JP | A-2000-512713 | 9/2000 |
| JP | A-2005-113877 | 4/2005 |
| JP | A-2006-138300 | 6/2006 |
| JP | A-2006-177247 | 7/2006 |

OTHER PUBLICATIONS

Mar. 9, 2010 International Preliminary Report on Patentability issued in PCT/JP2008/054889.

* cited by examiner

*Primary Examiner* — Stephen K Cronin
*Assistant Examiner* — Sherman Manley
(74) *Attorney, Agent, or Firm* — Oliff & Berridge, PLC

(57) ABSTRACT

A control device for an internal combustion engine in which controls can be simplified, and being capable of performing high-performance control by appropriately mediating a plurality of requirements. The device includes an emission control unit, a fuel consumption control unit and an idle stability control unit. Those units output requirements for the internal combustion engine on the basis of their respective aims. An efficiency mediation unit that mediates requirements from those units is provided. Furthermore, an actuator instruction value calculation unit, which determines instruction values for the plurality of actuators installed in the internal combustion engine on the basis of a result of mediation performed by the efficiency mediation unit, is also provided. The requirement is a requirement concerning torque efficiency, which indicates a ratio of a required torque to a reference torque that is obtained when operating points of the plurality of actuators are optimized.

3 Claims, 3 Drawing Sheets

CONTROL DEVICE FOR INTERNAL COMBUSTION ENGINE

FIELD OF THE INVENTION

The present invention relates to a control device for an internal combustion engine.

BACKGROUND ART

As for the control of an internal combustion engine, it is demanded that various kinds of capabilities such as emission capability, fuel consumption capability, idle stability and the like are satisfied. Each control logic for satisfying those capabilities outputs individually requirements for each actuator such as a throttle valve, an ignition system, a fuel injection system or the like of the internal combustion engine. In order to determine an instruction value for each actuator, it is necessary to mediate requirements output from each control logic for each actuator. This causes the control to be complicated.

Also, when control logic is changed, it is required to verify the dependent relationships between the logic and all actuators. Adversely, when an actuator is changed, it is required that every control logic outputting requirements for the actuator is reviewed. Consequently, it takes much time and energy to develop a control device for an internal combustion engine.

Japanese Patent Laid-Open No. 2000-512713 discloses an art of control devices for internal combustion engines. The art sets a control value such as throttle opening, ignition timing and injection quantity on the basis of a torque required by various controls such as drive skid control, gearbox control and travel dynamic behavior control as well as a torque required by a driver through an accelerator opening. According to the art, an intake air amount and an ignition timing are set on the basis of a torque value, and the ignition timing is set while taking ignition angle efficiency into account.

[Patent document 1]

Japanese Patent Laid-Open No. 2000-512713

DISCLOSURE OF THE INVENTION

Problem to be Solved by the Invention

As mentioned above, a concept named ignition angle efficiency is proposed in the above prior art. This concept represents an efficiency determined by taking a case of an optimal ignition timing as a basis, and being only a change in the representation of an actuator quantity (ignition timing). That is, it is impossible for the above prior art to consider any actuator except the ignition system.

The present invention has been made in view of the above-described point. An object of the present invention is to provide a control device for an internal combustion engine in which controls can be simplified, and being capable of performing high-performance control by appropriately mediating a plurality of requirements.

Means for Solving the Problem

In order to attain the object described above, a first aspect of the present invention is a control device for an internal combustion engine, the control device comprising:

a plurality of requirement output means for outputting requirements for the internal combustion engine on the basis of their respective aims;

mediation means for mediating the requirements output from the plurality of requirement output means; and actuator instruction value determination means for determining instruction values for the plurality of actuators installed in the internal combustion engine on the basis of a result of mediation performed by the mediation means;

wherein the requirement is a requirement concerning torque efficiency, which indicates a ratio of a required torque to a reference torque that is obtained when operating points of the plurality of actuators are optimized.

A second aspect of the present invention is the control device for an internal combustion engine according to the first aspect of the present invention, wherein the plurality of requirement output means include at least one of fuel consumption control means for outputting requirements for the aim of reducing fuel consumption, emission control means for outputting requirements for the aim of reducing emission and idle stability control means for outputting requirements for the aim of improving idle stability.

A third aspect of the present invention is the control device for an internal combustion engine according to the first or second aspect of the present invention, wherein the plurality of actuators include at least one of an ignition system for varying an ignition timing and a variable valve operating system for varying valve opening characteristic of an intake valve and/or an exhaust valve.

A fourth aspect of the present invention is the control device for an internal combustion engine according to any one of the first to the third aspects of the present invention, wherein the mediation means conducts mediation on the basis of the integration value of record of the requirement output from each requirement output means.

A fifth aspect of the present invention is the control device for an internal combustion engine according to the fourth aspect of the present invention, wherein the plurality of requirement output means include means for outputting a value concerning an average acceptable decreasing amount of the torque efficiency and means for outputting a value concerning a required decreasing amount of the torque efficiency; and the mediation means includes:

first mediation means which, when the required decreasing amount is smaller than the acceptable decreasing amount, reflects the required decreasing amount to the mediation result of torque efficiency as it is; and second mediation means which, when the required decreasing amount is larger than the acceptable decreasing amount, reflects the required decreasing amount to the mediation result of torque efficiency within the range where the integration value of the record of the torque efficiency decreasing amount resulted from the mediation does not exceed the integration value of the record of the acceptable decreasing amount.

EFFECT OF THE INVENTION

According to the first aspect of the present invention, requirements concerning torque efficiency output by the plurality of the requirement output means are mediated so as to determine instruction values for a plurality of actuators of the internal combustion engine based on the mediation result. Because of this, it is not necessary to mediate the requirements from the plurality of requirement output means on every actuator basis, and the mediation of requirements concerning torque efficiency can be performed integrally. As a result, the control can be simplified and it will be possible to shorten the development period and lower the development cost. Furthermore, all things to do is just a verification of the mediation result determined by the mediation means, i.e., an verification of the actuator instruction value is not required even when capability target (fuel consumption capability, emission capability or the like.) of the internal combustion engine is changed. Furthermore, it is possible to cope with a situation only by reviewing the actuator instruction value determination means and the like without reviewing the content of the requirements from the individual requirement output means even when any actuator is changed to another one having a different specification. In addition, the emission capability can be controlled by exhaust energy since the exhaust energy can be also controlled by controlling the torque efficiency. Consequently, the application of a physical-model-based control can be eased and high-performance control can be performed.

According to the second aspect of the present invention, high-performance control that can satisfy requirements for various capabilities such as fuel consumption capability, emission capability, and idle stability can be performed.

According to the third aspect of the present invention, high-performance control can be performed by using the torque efficiency that is changed depending on the ignition timing and the valve opening characteristic of the intake valve or the exhaust valve as a basis.

According to the fourth aspect of the present invention, a more appropriate mediation result can be calculated on the basis of the time integration value of the requirement from each requirement output means.

According to the fifth aspect of the present invention, the required decreasing amount can be satisfied within the range where the time average value of the torque efficiency decreasing amount can satisfy the acceptable decreasing amount in a case where there are provided the requirement output means (e. g., a fuel consumption control unit or the like) for outputting a value concerning an average acceptable decreasing amount of torque efficiency as well as the requirement output means (e. g., an emission control unit, an idle stability control unit or the like) for outputting a value concerning a required decreasing amount of torque efficiency. Consequently, more high-performance control can be performed by ensuring the realization of target fuel consumption capability with, for example, improved emission capability and idle stability.

DESCRIPTION OF NOTATIONS

Figure 1:
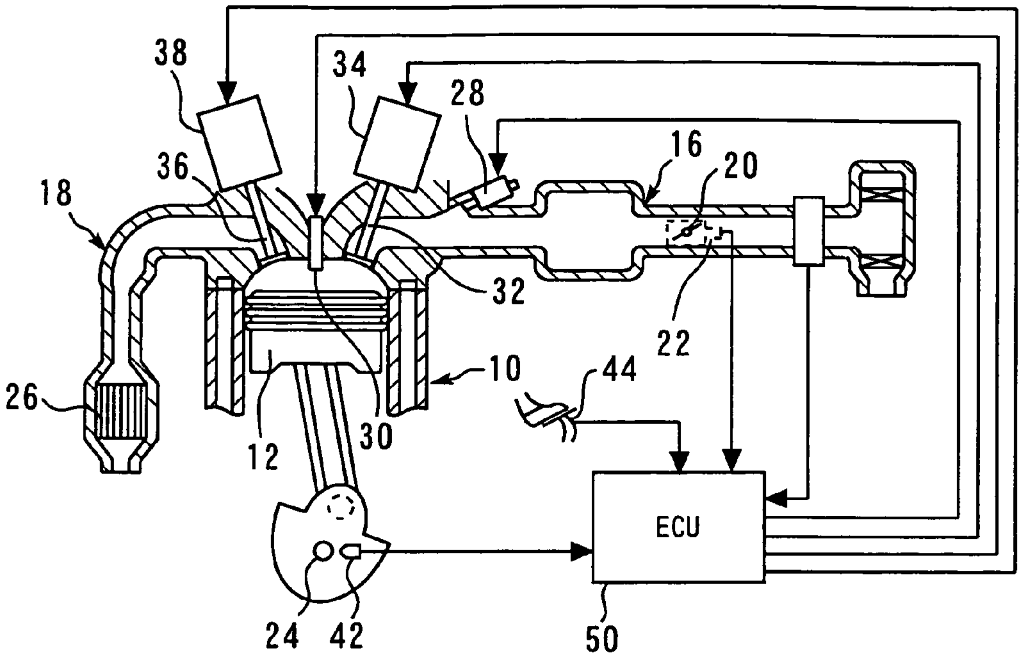
FIG. 1 is a schematic diagram illustrating the system configuration according to a first embodiment of the present invention.

10 internal combustion engine
12 piston
16 intake path
18 exhaust path
26 catalyst
32 intake valve
34 intake-side variable valve operating system
36 exhaust valve
38 exhaust-side variable valve operating system
50 ECU

BEST MODE FOR CARRYING OUT THE INVENTION

First embodiment

[Description of the System Configuration]

FIG. 1 is a schematic diagram illustrating the system configuration according to a first embodiment of the present invention. The configuration shown in FIG. 1 is provided with an internal combustion engine 10. The number of cylinders and the cylinder arrangement of the internal combustion engine 10 are not limited particularly. A piston 12 is installed in each cylinder of the internal combustion engine 10. An intake path 16 and an exhaust path 18 communicate with each cylinder.

A throttle valve 20 is installed in the intake path 16. A throttle position sensor 22 detecting a throttle opening angle TA is installed in the vicinity of the throttle valve 20. A catalyst 26 for purifying exhaust gas is equipped in the exhaust path 18.

Each cylinder of the internal combustion engine 10 has a fuel injector 28 for injecting fuel in an intake port and an ignition plug 30 for igniting fuel/air mixture in a combustion chamber. However, the present invention is not limited to a port-injection engine shown in the figure, and can be applied to a direct-injection engine or an engine with both injection systems.

The internal combustion engine 10 further includes an intake-side variable valve operating system 34, which changes the valve opening characteristics of the intake valve 32, and an exhaust-side variable valve operating system 38, which changes the valve opening characteristics of the exhaust valve 36. The concrete mechanism of the intake-side variable valve operating system 34 and the exhaust-side variable valve operating system 38 is not limited to a specific one, and well-known various mechanisms can be used.

A crank angle sensor 42 for detecting a rotation angle (crank angle) of a crankshaft 24 is installed in the vicinity of the crankshaft 24 of the internal combustion engine 10. An accelerator position sensor 44 for detecting an accelerator opening angle is installed in the vicinity of an accelerator pedal.

The system shown in FIG. 1 is provided with an ECU (Electronic Control Unit) 50. The ECU 50 is electrically connected to various sensors such as the aforementioned throttle position sensor 22, the crank angle sensor 42 and the accelerator position sensor 44. The ECU 50 is also electrically connected to various apparatuses such as the aforementioned throttle valve 20, the fuel injector 28, the ignition plug 30, the intake-side variable valve operating system 34 and the exhaust-side variable valve operating system 38.

[Feature of the First Embodiment]

Figure 2:
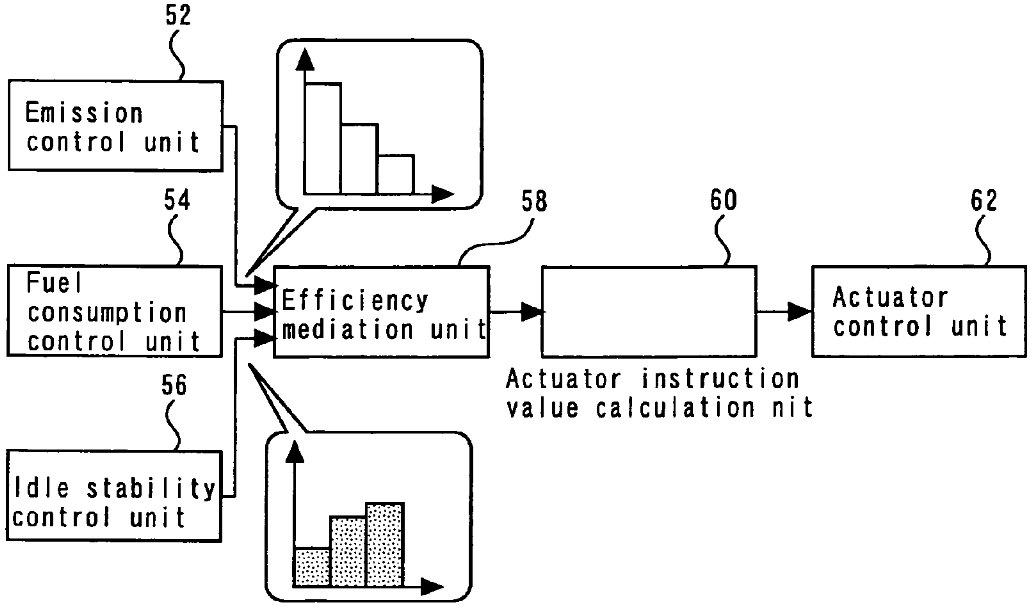
FIG. 2 is a block diagram illustrating some functions of an ECU.

FIG. 2 is a block diagram illustrating some functions of the ECU 50. The ECU 50 includes an emission control unit 52, a fuel consumption control unit 54 and an idle stability control unit 56 as shown in FIG. 2. The emission control unit 52, the fuel consumption control unit 54 and the idle stability control unit 56 output requirements concerning a torque efficiency, respectively, depending on an operating state or the like of the internal combustion engine 10.

Here, the "torque efficiency" in the present specification is a value defined as a ratio of a required torque to a reference torque (reference engine torque) that is obtained when the operating points of the plurality of actuators (the ignition system including the ignition plug 30, the intake-side variable valve operating system 34, the exhaust-side variable valve operating system 38 and the like) installed in the internal combustion engine 10 are optimized, and being a value equal to or less than 1.

As is generally known, there exists an optimal ignition timing called MBT (Minimum advance for the Best Torque) by which the torque is maximized, regarding the concept of the ignition timing. Similarly, there exists an optimal operation point by which the torque is maximized, also with regard to the valve opening characteristics of the intake valve 32 or the valve opening characteristics of the exhaust valve 36. The aforementioned reference torque is an engine torque that is obtained when the operating point of each actuator is optimized in that manner.

The fuel consumption capability is improved as the torque efficiency approaches 1. The fuel consumption control unit 54, therefore, outputs requirements concerning the torque efficiency so that the torque efficiency is maintained as high as possible.

On the other hand, the exhaust energy becomes small as the torque efficiency approaches 1 since the thermal efficiency of the internal combustion engine 10 becomes high. From a standpoint for reducing emission, promptly warming-up of the catalyst 26 may be requested when the catalyst 26 is at low temperature. In such a case, it is desirable to increase the exhaust energy, that is, to decrease the torque efficiency to some extent. The emission control unit 52 outputs requirements concerning the torque efficiency from such a point of view.

Vibration and noise are apt to be produced due to the fluctuation of the engine speed (idle speed) when an accessories driving load is varied depending on ON/OFF of accessories such as an alternator and a compressor of an air conditioner under an idle driving of the internal combustion engine 10. The idle stability control unit 56 outputs requirements concerning torque efficiency to maintain constant idle speed. In order to maintain the idle speed to be constant when the accessories are turned ON, it is necessary to increase engine torque instantly by, for example, advancing the ignition timing. However, it is impossible to increase engine torque any more in a condition where the torque efficiency is 1. Thus, the idle stability control unit 56 outputs requirements concerning torque efficiency, for example, to decrease the torque efficiency beforehand in the situation that the accessories are expected to be turned ON.

Requirements regarding torque efficiency output from the emission control unit 52, the fuel consumption control unit 54 and the idle stability control unit 56, respectively are gathered to an efficiency mediation unit 58. The efficiency mediation unit 58 calculates the target value of torque efficiency by mediating those requirements in accordance with predetermined rules.

An actuator instruction value calculation unit 60 calculates instruction values (an ignition timing, valve opening characteristic of the intake valve 32, valve opening characteristic of the exhaust valve 36, etc.) for each actuator on the basis of the torque efficiency target value that is calculated by the efficiency mediation unit 58. The actuator instruction value calculation unit 60 prestores a map showing the relationship between torque efficiency and each actuator instruction value for realizing that. Each actuator instruction value is calculated in accordance with the map.

An actuator control unit 62 controls the operation of the ignition system, the intake-side variable valve operating system 34 and the exhaust-side variable valve operating system 36 in accordance with each actuator instruction value calculated by the actuator instruction value calculation unit 60.

As discussed above, according to the system of the present embodiment, the target value of torque efficiency is determined by the mediation of requirements concerning torque efficiency output from each control unit 52, 54 and 56, and each actuator instruction value is calculated based on the torque efficiency target value. Consequently, it is not necessary to mediate requirements on every actuator basis, and the mediation of requirements concerning torque efficiency can be performed integrally. As a result, the control can be simplified and it will be possible to shorten the development period and lower the development cost.

Furthermore, all things to do is just a verification of the mediation result (torque efficiency target value) determined by the efficiency mediation unit 58, i.e., an verification of the actuator instruction value is not required even when the performance target (target of fuel consumption capability, emission capability, etc.) of the internal combustion engine 10 is changed.

On the other hand, it is possible to cope with a situation only by reviewing the actuator instruction value calculation unit 60 or the actuator control unit 62 without reviewing the content of the requirements from the individual control unit 52, 54 and 56 even when any actuator is changed to another one having a different specification.

In addition, the emission capability can be controlled by exhaust energy since the exhaust energy can be also controlled by controlling the torque efficiency. Consequently, the application of a physical-model-based control can be eased and high-performance control can be performed.

In the first embodiment described above, the emission control unit 52, the fuel consumption control unit 54 and the idle stability control unit 56 correspond to the "plurality of requirement output means" according to the above first aspect of the present invention. The efficiency mediation unit 58 corresponds to the "mediation means" according to the above first aspect of the present invention. The actuator instruction value calculation unit 60 corresponds to the "actuator instruction value determination means" according to the above first aspect of the present invention.

Second Embodiment

Next, a second embodiment of the present invention will be now described with reference to FIG. 3 and FIG. 4. Here, differences with the above described first embodiment will be described mainly, and the description about similar matters will be simplified or omitted.

The present embodiment can be realized with the system configuration shown in FIG. 1 and FIG. 2 like the above described first embodiment.

[Feature of the Second Embodiment]

Figure 3:
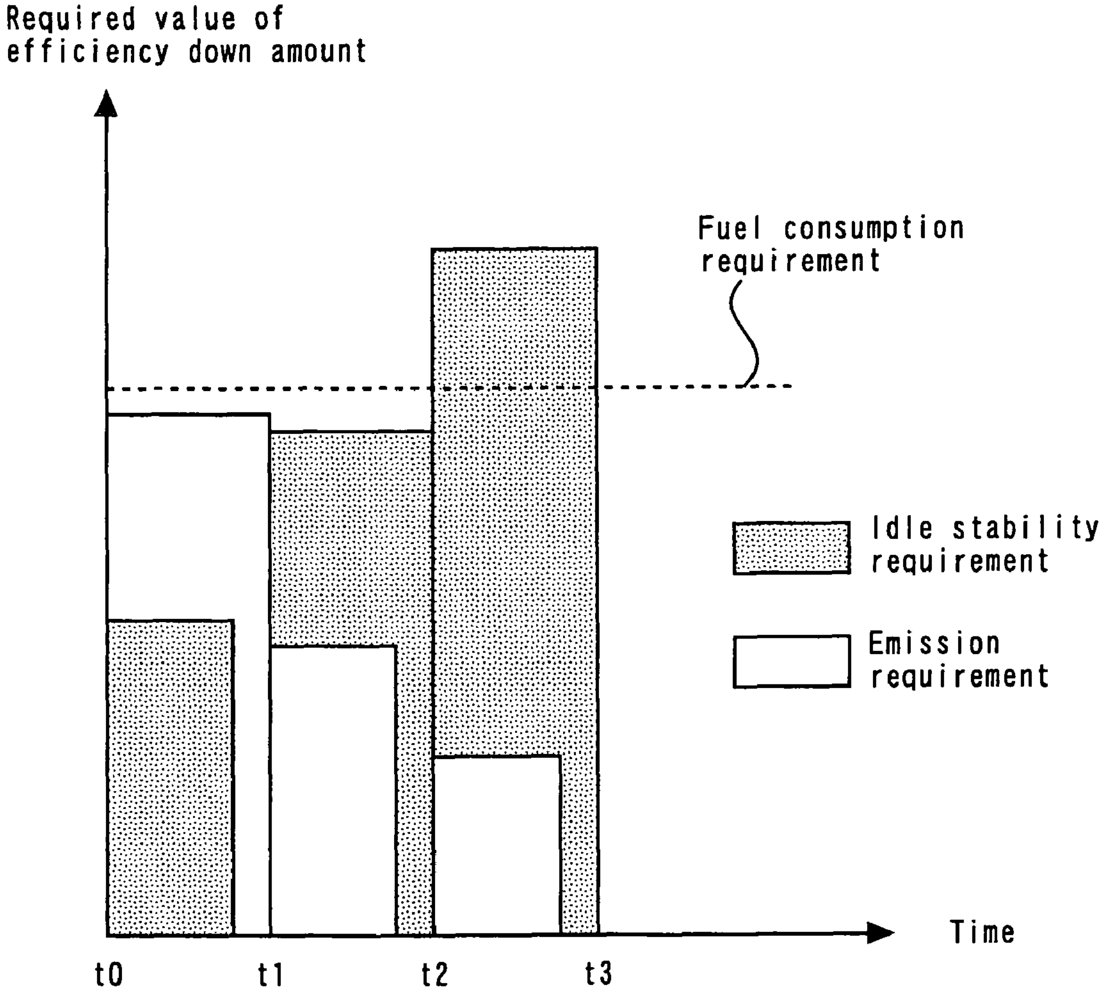
FIG. 3 is an illustration of requirements concerning torque efficiency output from each control unit in a second embodiment of the present invention.

FIG. 3 is an illustration of requirements concerning torque efficiency output from the emission control unit 52, the fuel consumption control unit 54 and the idle stability control unit 56 in the present embodiment. In FIG. 3, an "efficiency down amount" shows the drop amount of torque efficiency when compared with 1, which is the maximum value of torque efficiency The fuel consumption control unit 54 outputs the acceptable value of time average of the efficiency down amount as a requirement as shown by a dotted line in FIG. 3. In other words, the fuel consumption control unit 54 requires that the time average of the efficiency down amount becomes lower than or equal to the value of the height shown by a dotted line in FIG. 3.

In contrast, the emission control unit 52 and the idle stability control unit 56 sequentially output a necessary efficiency down amount as a requirement depending on the operating state, respectively. In other words, the emission control unit 52 and the idle stability control unit 56 require the efficiency down amount up to the height of the bar graph shown in FIG. 3 at each time, respectively.

Next, the mediation method employed in the efficiency mediation unit 58 when requirements such as shown in FIG. 3 are output from the emission control unit 52, the fuel consumption control unit 54 and the idle stability control unit 56, respectively will be described. FIG. 4 is an illustration of the mediation result obtained by the efficiency mediation unit 58 meditating each requirement shown in FIG. 3.

In the following description, larger one of either the required value of the efficiency down amount output from the emission control unit 52 or the required value of the efficiency down amount output from the idle stability control unit 56 is referred to as the "required efficiency down amount". In addition, acceptable value of time average of the efficiency down amount output from the fuel consumption control unit 54 is referred to as the "acceptable efficiency down amount". In this case, the idle stability control unit 56 calculates the mediation result in accordance with following mediation rules 1 and 2.

(Mediation Rule 1)

When the required efficiency down amount is smaller than the acceptable efficiency down amount, the required efficiency down amount is reflected to the mediation result as it is.

(Mediation Rule 2)

When the required efficiency down amount is larger than the acceptable efficiency down amount, the required efficiency down amount is reflected to the mediation result, as long as the integration (time integration) value of the record of the efficiency down amount determined as a result of the mediation does not exceed the integration (time integration) value of the record of the acceptable efficiency down amount.

During the period from time point t0 to time point t1 in FIG. 3, the efficiency down amount output from the emission control unit 52 is selected as the required efficiency down amount. This required efficiency down amount is smaller than the acceptable efficiency down amount output from the fuel consumption control unit 54. Consequently, as shown in FIG. 4, the required efficiency down amount output from the emission control unit 52 is reflected to the mediation result as it is during the period from time point t0 to time point t1. In other words, the value calculated by subtracting the required efficiency down amount output from the emission control unit 52 from 1 is set as the target value of torque efficiency.

Furthermore, during the period from time point t1 to time point t2 in FIG. 3, the efficiency down amount output from the idle stability control unit 56 is selected as the required efficiency down amount. This required efficiency down amount is smaller than the acceptable efficiency down amount output from the fuel consumption control unit 54. Consequently, as shown in FIG. 4, the required efficiency down amount output from the idle stability control unit 56 is reflected to the mediation result as it is during the period from time point t1 to time point t2. In other words, the value calculated by subtracting the required efficiency down amount output from the idle stability control unit 56 from 1 is set as the target value of torque efficiency.

As described above, during the period from time point t0 to time point t2, the efficiency down amount determined as a result of the mediation is smaller than the acceptable efficiency down amount. That is, during the period from time point t0 to time point t2, the mediation result is preferable compare to the fuel consumption capability required by the fuel consumption control unit 54 so as to have a margin. The margin can be represented by the area A in FIG. 4.

On the other hand, during the period from time point t2 to time point t3 in FIG. 3, the efficiency down amount output from the idle stability control unit 56 is selected as the required efficiency down amount. However, this required efficiency down amount is larger than the acceptable efficiency down amount output from the fuel consumption control unit 54. Consequently, the mediation rule 2 is applied to the present case, as follows.

In order to prevent the time integration value of the efficiency down amount resulted from the mediation from exceeding the time integration value of the acceptable efficiency down amount during the period from time point t0 to time point t3, it is necessary for the area A and the area B in F*ig*. 4 to be equal. Consequently, the mediation result is decided to make the area A and the area B equal during the period from time point t2 to time point t3. For this reason, during the period from time point t2 to time point t3, the value that is larger than the acceptable efficiency down amount and smaller than the required efficiency down amount is set as the mediation result. Consequently, the required efficiency down amount is satisfied not wholly but partly. In other words, a mediation result is used that is above the acceptable efficiency down amount and prevents the area B (a first total area) that is determined by an amount by which the required efficiency down amount will be above the acceptable efficiency down amount over time (from time point t2 to time point t3) from exceeding the area A (a second total area) that is determined by an amount by which the required efficiency down amount has been below the acceptable efficiency down amount over time (from time point t0 to time point t2) when the required efficiency down amount is larger than the acceptable efficiency down amount. Of course, if the required efficiency down amount is less than the mediation result when the required efficiency down amount is larger than the acceptable efficiency down amount, then the required efficiency down amount is used.

Figure 4:
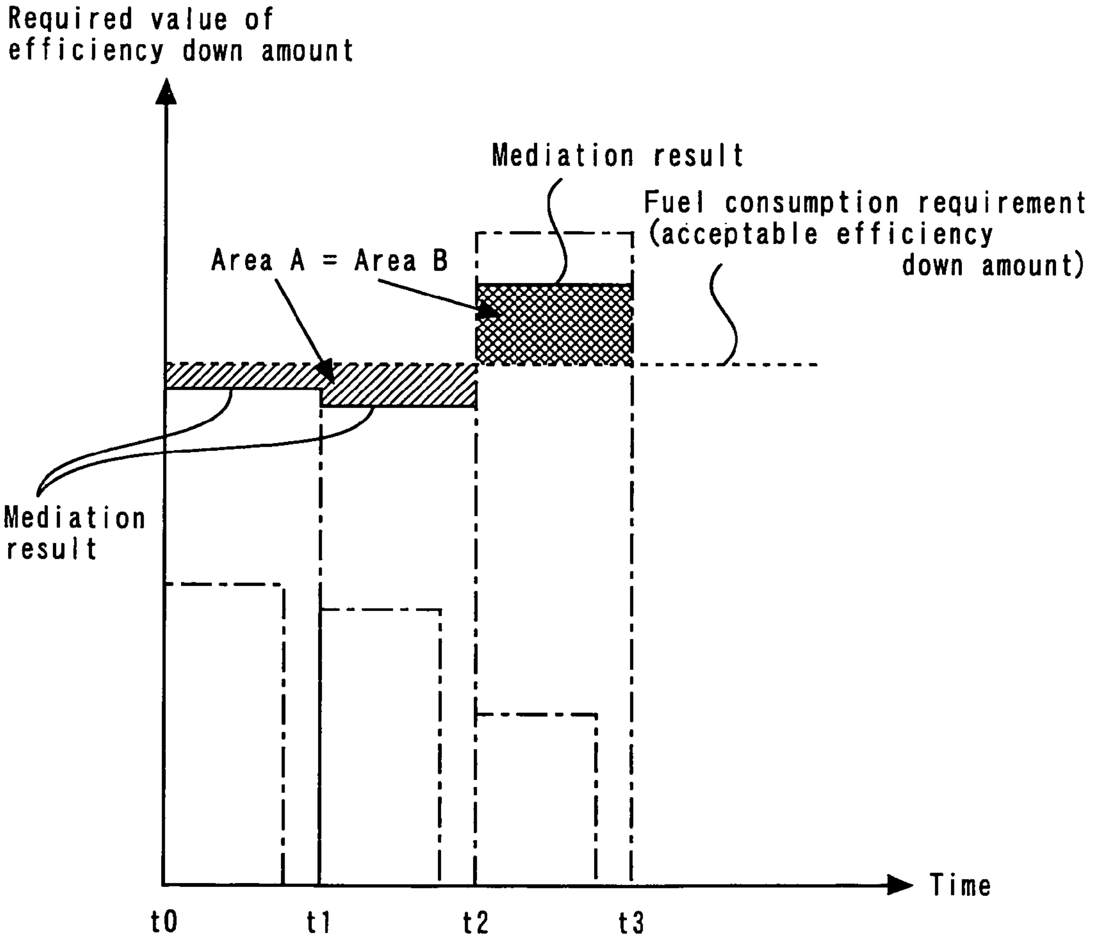
FIG. 4 is an illustration of the result of the mediation of each requirement shown in FIG. 3 by an efficiency mediation unit.

In other words, according to the mediation method employed in the present invention, when the required efficiency down amount exceeds the acceptable efficiency down amount, it is allowed to decrease torque efficiency beyond the acceptable efficiency down amount only within the margin for the requirement from the fuel consumption control unit 54 ensured until this time (area A in FIG. 4).

According to the aforementioned mediation method employed in the present invention, the requirements from the emission control unit 52 and the idle stability control unit 56 can be satisfied within the range where the time average value of the efficiency down amount can satisfy the requirement from the fuel consumption control unit 54. Consequently, high-performance control can be performed by ensuring the realization of the target fuel consumption capability with improving emission engine-performance and idle stability.

Note that, in the aforementioned second embodiment, the acceptable efficiency down amount corresponds to the "acceptable amount of decrease" according to the above fifth aspect of the present invention, and the required efficiency down amount corresponds to the "required amount of decrease" according to the above fifth aspect of the present invention. Furthermore, the "first mediation means" according to the above fifth aspect of the present invention is implemented when the ECU 50 executes processing in accordance with the aforementioned mediation rule 1, and the "second mediation means" according to the above fifth aspect of the present invention is implemented when the ECU 50 executes processing in accordance with the aforementioned mediation rule 2.

The invention claimed is:

1. A control device for an internal combustion engine, the control device comprising:

a plurality of actuators; and a controller that is programmed to:

output requirements concerning torque efficiency, which indicates a ratio of a required torque to a reference torque that is obtained when operating points of the plurality of actuators are optimized, for the internal combustion engine, wherein the controller outputs a value concerning an average acceptable decreasing amount of the torque efficiency with reference to a maximum value of the torque efficiency and calculates sequentially a value concerning a required decreasing amount of the torque efficiency with reference to the maximum value of the torque efficiency;

mediate the requirements concerning the torque efficiency in accordance with a predetermined mediation rule and calculate a target value of the torque efficiency from a result of mediation, wherein the controller selects the required decreasing amount as the result of mediation when the required decreasing amount is smaller than the acceptable decreasing amount and selects a smaller value of the required decreasing amount and a mediation result that is above the acceptable decreasing amount and prevents a first total area that is determined by an amount by which the required decreasing amount will be above the acceptable decreasing amount over time from exceeding a second total area that is determined by an amount by which the required decreasing amount has been below the acceptable decreasing amount over time when the required decreasing amount is larger than the acceptable decreasing amount; and determine instruction values for the plurality of actuators installed in the internal combustion engine based on the target value of the torque efficiency calculated.

2. The control device for an internal combustion engine according to claim 1, wherein when the controller outputs the value concerning the average acceptable decreasing amount of the torque efficiency with reference to the maximum value of the torque efficiency, the controller outputs requirements to reduce fuel consumption; and when the controller calculates sequentially the value concerning the required decreasing amount of the torque efficiency with reference to the maximum value of the torque efficiency, the controller outputs requirements to reduce emission and to improve idle stability.

3. The control device for an internal combustion engine according to claim 1, wherein the plurality of actuators include at least one of an ignition system for varying an ignition timing and a variable valve operating system for varying valve opening characteristic of an intake valve and/or an exhaust valve.

* * * * *